(12) United States Patent
Berndt

(10) Patent No.: US 6,834,319 B1
(45) Date of Patent: Dec. 21, 2004

(54) TUNNEL DEVICE FOR AN INPUT/OUTPUT NODE OF A COMPUTER SYSTEM

(75) Inventor: Paul W. Berndt, Austin, TX (US)

(73) Assignee: Advanced Micro Devices, Inc., Sunnyvale, CA (US)

(*) Notice: Subject to any disclaimer, the term of this patent is extended or adjusted under 35 U.S.C. 154(b) by 433 days.

(21) Appl. No.: 10/103,369

(22) Filed: Mar. 21, 2002

(51) Int. Cl.[7] ............................................. G06F 13/00
(52) U.S. Cl. ........................... 710/307; 710/29; 710/62; 710/66; 710/313
(58) Field of Search ............................. 710/29, 62, 66, 710/307, 313

(56) References Cited

U.S. PATENT DOCUMENTS

| | | |
|---|---|---|
| 6,278,532 B1 | 8/2001 | Heimendinger et al. |
| 6,414,961 B1 | 7/2002 | Katayanagi |
| 6,415,345 B1 | 7/2002 | Wu et al. |
| 6,445,718 B1 * | 9/2002 | Muto .......................... 370/474 |
| 6,697,890 B1 * | 2/2004 | Gulick et al. ................. 710/62 |
| 2003/0097514 A1 * | 5/2003 | Ennis et al. ................. 710/306 |

OTHER PUBLICATIONS

"HyperTransport Technology I/O Link: A High–Bandwidth I/O Architecture" White Paper; Advanced Micro Devices, Inc.; Sunnyvale, CA; Jul. 20, 2001.*

* cited by examiner

*Primary Examiner*—Glenn A. Auve
(74) *Attorney, Agent, or Firm*—Meyertons Hood Kivlin Kowert & Goetzel, P.C.; B. Noël Kivlin; Stephen J. Curran

(57) ABSTRACT

A tunnel device for an input/output node of a computer system. A tunnel device includes a first interface, a second interface and a control unit. The first interface may receive a plurality of data bytes associated with a command packet on a first external input/output bus. The second interface may be coupled to the first interface by an internal data path configured to convey up to a maximum number of data bytes in a given cycle. The control unit may be coupled to control the conveyance of the data bytes from the first interface to the second interface upon the internal data path. The first interface may further align the smaller number of data bytes on a corresponding number of designated bits of the internal data path with no intervening invalid data bytes when conveying a smaller number of data bytes than the maximum number of data bytes.

35 Claims, 6 Drawing Sheets

TUNNEL DEVICE FOR AN INPUT/OUTPUT NODE OF A COMPUTER SYSTEM

BACKGROUND OF THE INVENTION

1. Field of the Invention

This invention relates to computer system input/output (I/O) nodes and, more particularly, to transaction handling in a tunnel device for an I/O node.

2. Description of the Related Art

In a typical computer system, one or more processors may communicate with input/output (I/O) devices over one or more buses. In addition those processors may communicate with each other through an additional bus or buses. In many cases, these buses are shared buses.

Unfortunately, many shared bus systems suffer from drawbacks. For example, multiple devices attached to a bus may present a relatively large electrical capacitance to devices driving signals on the bus. In addition, the multiple attach points on a shared bus produce signal reflections at high signal frequencies which reduce signal integrity. As a result, signal frequencies on the bus are generally kept relatively low in order to maintain signal integrity at an acceptable level. The relatively low signal frequencies reduce signal bandwidth, limiting the performance of devices attached to the bus. An example of a shared bus used by many systems is a front side bus (FSB), which may typically interconnect one or more processors and a system controller.

To overcome some of the drawbacks of a shared bus, some computers systems may use packet-based communications such as point-to-point links, for example, between devices or nodes. In such systems, nodes may communicate with each other by exchanging packets of information. In general, a "node" is a device which is capable of participating in transactions upon an interconnect. For example, the interconnect may be packet-based, and the node may be configured to receive and transmit packets. Generally speaking, a "packet" is a communication between two nodes: an initiating or "source" node which transmits the packet and a destination or "target" node which receives the packet. When a packet reaches the target node, the target node accepts the information conveyed by the packet and processes the information internally. A node located on a communication path between the source and target nodes may relay or forward the packet from the source node to the target node.

When some of these nodes forward a transaction, the transaction may be received into the forwarding node at one frequency and on a bus having a given width. The transaction may then be internally forwarded onto another bus or path having a different frequency and width before the transaction is finally forwarded onto a second external bus.

SUMMARY OF THE INVENTION

Various embodiments of a tunnel device for an input/output node of a computer system are disclosed. In one embodiment, a tunnel device includes a first interface, a second interface and a control unit. The first interface may be configured to receive a plurality of data bytes associated with a command packet on a first external input/output bus. The external input/output bus may be for example a packet bus compatible with HyperTransport™ technology. The second interface may be coupled to the first interface by an internal data path configured to convey up to a maximum number of data bytes in a given cycle. The second interface may also be configured to transmit the data bytes on a second external input/output bus. The control unit may be coupled to control the conveyance of the data bytes from the first interface to the second interface upon the internal data path. The first interface may be further configured to align the smaller number of data bytes on a corresponding number of designated bits of the internal data path with no intervening invalid data bytes when conveying a smaller number of data bytes than the maximum number of data bytes.

In one particular implementation, the maximum number of data byes may be 16 and may include four subsets of data bytes. The four subsets of data bytes may include a first subset of data bytes having a first fixed number of data bytes, a second subset of data bytes having a second fixed number of data bytes, a third subset of data bytes having a third fixed number of data bytes and a fourth subset of data bytes having a fourth fixed number of data bytes. The second subset of data bytes may include the first subset of data bytes. The third subset of data bytes may include the first subset of data bytes and the second subset of data bytes. Further, the fourth subset of data bytes may include the first subset of data bytes, the second subset of data bytes and the third subset of data bytes.

In another specific implementation, the first fixed number of data bytes may be four, the second fixed number of data bytes may be eight, the third fixed number of data bytes may be 12 and the fourth fixed number of data bytes may be 16. In yet another specific implementation, the first interface may be further configured to transmit the first, second, third and the fourth subset of data bytes on the corresponding number of designated bits of the internal data path such that the first subset of data bytes may be aligned to the lowest order group of bits of the internal data path.

In still another specific implementation, the first interface may be further configured to transmit the first, second, third and the fourth subset of data bytes on the corresponding number of designated bits of the internal data path such that the first subset of data bytes may be aligned to the highest order group of bits of the internal data path.

Figure 1:
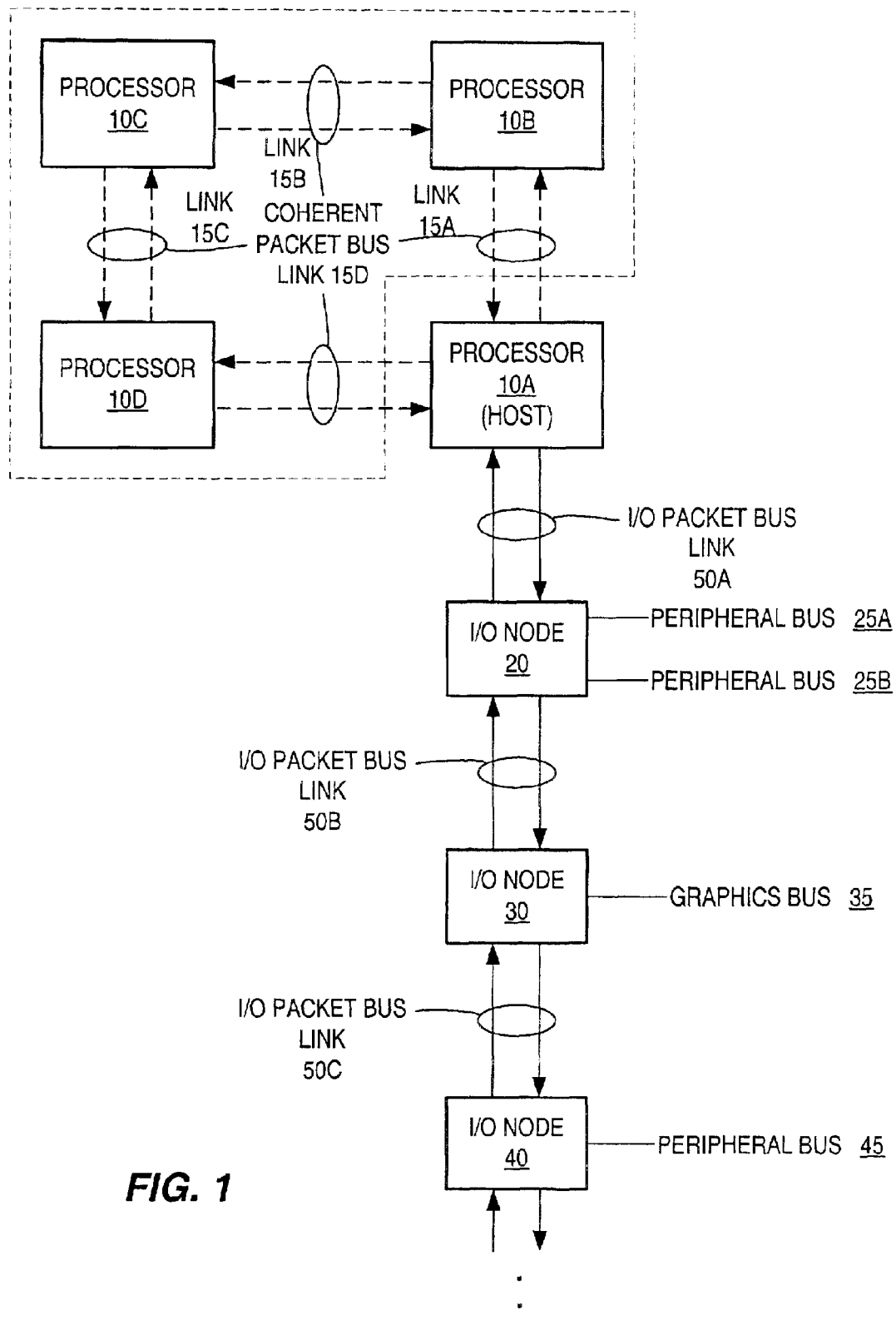
FIG. 1 is a block diagram of one embodiment of a computer system.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION

Turning now to FIG. 1, a block diagram of one embodiment of a computer system is shown. The computer system includes processors 10A–10D each interconnected by a coherent packet bus including links 15A–D. Each link of coherent packet bus 15 may form a high-speed point-to-point link. The computer system also includes three I/O nodes numbered 20, 30 and 40 each connected together in a chain by non-coherent (NC) packet bus links 50B and 50C respectively. NC packet bus link 50A is coupled between host node/processor 10A and I/O node 20. Processor 10A is illustrated as a host node and may include a host bridge for communicating with I/O node 20 via NC packet bus link 50A. Processors 10B–D may also include host bridges for communication with other I/O nodes (not shown). The NC packet bus links formed by NC packet bus 50A–C may also be referred to as a point-to-point links. I/O node 20 is connected to a pair of peripheral buses 25A–B. I/O node 30 is connected to a graphics bus 35, while I/O node 40 is connected to an additional peripheral bus 45. It is noted that in other embodiments, other numbers of processors may be used.

In the present embodiment, each link of coherent packet bus 15 is implemented as sets of unidirectional lines (e.g. lines 15A are used to transmit packets between processor 10A and processor 10B and lines 15B are used to transmit packets between processor 10B and processor 10C). Other sets of lines 15C–D are used to transmit packets between other processors as illustrated in FIG. 1. The coherent packet bus 15 may be operated in a cache coherent fashion for communication between processing nodes ("the coherent link"). Further, non-coherent packet bus 50 may be operated in a non-coherent fashion for communication between I/O nodes and between I/O nodes and a host bridge such as the host bridge of processor 10A ("the non-coherent link"). The interconnection of two or more nodes via coherent links may be referred to as a "coherent fabric". Similarly, the interconnection of two or more nodes via non-coherent links may be referred to as a "non-coherent fabric". It is noted that a packet to be transmitted from one processor to another may pass through one or more intermediate nodes. For example, a packet transmitted by processor 10A to processor 10C may pass through either processor 10B or processor 10D as shown in FIG. 1. Any suitable routing algorithm may be used.

Processors 10A–10D are each illustrative of, for example, an x86 microprocessor such as an Athlon™ microprocessor. In addition, one example of a packet bus such as non-coherent packet bus 50 may be compatible with HyperTransport™ technology. Peripheral buses 25A, 25B and 45 are illustrative of a common peripheral bus such as a peripheral component interconnect (PCI) bus and graphics bus 35 is illustrative of an accelerated graphics port (AGP) interconnect, for example. It is understood, however, that other types of processors and buses may be used.

It is noted that while three I/O nodes are shown connected to host processor 10A, other embodiments may have other numbers of nodes and those nodes may be connected in other topologies. The chain topology illustrated in FIG. 1 is shown for its ease of understanding.

In the illustrated embodiment, the host bridge of processor 10A may receive upstream packet transactions from downstream nodes such as I/O node 20, 30 or 40. Alternatively, the host bridge of processor 10A may transmit packets downstream to devices such as peripheral devices (not shown) that may be connected to peripheral bus 25A for example.

Generally speaking, a packet is a communication between two nodes (an initiating node which transmits the packet and a destination node which receives the packet). The initiating node and the destination node may differ from the source and target node of the transaction of which the packet is a part, or either node may be either the source node or the target node. A control packet is a packet carrying control information regarding the transaction. Certain control packets specify that a data packet follows. The data packet carries data corresponding to the transaction and corresponding to the specifying control packet. In one embodiment, control packets may include command packets, info packets and response packets. It is noted that other embodiments are contemplated which include other types of packets.

As packets travel upstream or downstream on the non-coherent links or between coherent nodes on the coherent links, the packets may pass through one or more nodes. As used herein, "upstream" refers to packet traffic flow in the direction of the host bridge of processor 10A from an I/O node and "downstream" refers to packet traffic flow in the direction away from the host bridge of processor 10A to an I/O node. As will be described in greater detail below, to preserve the ordering rules of the various buses that may be connected to a given I/O node, the node may provide transaction reordering as well as packet buffering. Likewise, other nodes may include buffers for preventing commands from blocking each other due to logical conflicts between packets of a given type.

Generally speaking, a "virtual channel" is a communication path for carrying packets between various processors and I/O nodes. Each virtual channel is resource-independent of the other virtual channels (i.e. packets flowing in one virtual channel may be given separate and independent resources such that they are generally not affected, in terms of physical transmission, by the presence or absence of packets in another virtual channel due to buffer management and routing issues). Packets are assigned to a virtual channel based upon packet type. Packets in the same virtual channel may physically conflict with each other's transmission (i.e. packets in the same virtual channel may experience resource conflicts) and may not physically conflict with the transmission of packets in a different virtual channel.

For example, if a first packet, for logical/protocol reasons, must arrive at its destination node before a second packet arrives at its destination node, it is possible that a computer system could deadlock if the second packet physically blocks the first packet's transmission (by occupying conflicting resources). As will be described further below, deadlock-free operation may be achieved by assigning the first and second rackets to separate virtual channels, and by implementing the transmission medium such that packets in separate virtual channels may not physically block each other's transmission. However, certain packets may logically conflict with other packets (i.e. for protocol reasons, coherency and ordering reasons, or other such reasons, one packet may logically conflict with another packet). Thus to maintain I/O ordering, some ordering rules may cause dependencies between packets originating at the same node but travel within different virtual channels. These dependencies may cause one packet traveling in one virtual channel to logically block a packet traveling on a different virtual channel. It is noted that the packets from different virtual channels are transmitted over the same physical links. Thus, a separate receiving buffer for each virtual channel may be available prior to transmission.

In one embodiment, control packets include commands such as posted and non-posted writes, and non-posted reads. In addition, control packets include responses. Thus, to support operation as described above, the non-coherent packet interface may support three virtual channels corresponding to the three types of commands: non-posted, posted and response. It is noted however, that in other embodiments, other virtual channels are contemplated and may be used and supported.

During operation, I/O node 20 and 40 may translate peripheral bus transactions such as PCI transactions, for example, into upstream packet transactions that travel in I/O streams and additionally may translate downstream packet transactions into PCI bus transactions. All packets originating at nodes other than the host bridge of processor 10A may flow upstream to the host bridge of processor 10A before being forwarded to any other node. All packets originating at the host bridge of processor 10A may flow downstream to other nodes such as I/O node 20, 30 or 40. Each I/O stream may be identified by an identifier called a Unit ID. It is contemplated that the Unit ID may be part of a packet header or it may be some other designated number of bits in a packet or packets. As used herein, "I/O stream" refers to all packet transactions that contain the same Unit ID and therefore originate from the same node.

To illustrate, a peripheral device on peripheral bus 45 initiates a transaction directed to a peripheral device on peripheral bus 25. The transaction may first be translated into one or more packets with a unique Unit ID and then transmitted upstream. It is noted that each packet may be encoded with specific information which identifies the packet. For example the Unit ID may be encoded into the packet header. Additionally, the type of transaction may also be encoded into the packet header. Each packet may be assigned a Unit ID that identifies the originating node. In the present embodiment, I/O node 20 may not forward packets to a peripheral device on peripheral bus 25 from downstream; the packets are first transmitted upstream to the host bridge of processor 10A. The host bridge of processor 10A may then transmit or "reflect" the packets back downstream with a Unit ID of the host bridge of processor 10A where I/O node 20 recognizes and claims the packet for the peripheral device on peripheral bus 25. I/O node 20 may then translate the packets into peripheral bus transactions and transmit the transactions to the peripheral device on peripheral bus 25. Further, transactions originating at the host bridge of processor 10A will also contain the Unit ID of the host bridge of processor 10A. However, certain packets that are transmitted downstream may contain the Unit ID of the sending device.

As the packet transactions travel upstream or downstream, the packets may pass through one or more I/O nodes. The pass-through is sometimes referred to as a tunnel and the I/O node is sometimes referred to as a tunnel device. Packets that are sent from upstream to downstream or from downstream to upstream are referred to as "forwarded" traffic. Additionally, packet traffic that originates at a particular I/O node and is inserted into the upstream traffic is referred to as "injected" traffic.

As will be described in greater detail below, to preserve the ordering rules of the various buses that may be connected to an I/O node and to avoid possible system deadlocks, the I/O node may provide transaction reordering as well as packet buffering. The I/O node may also include control logic which controls the flow of packets into and out of the tunnel.

Figure 2:
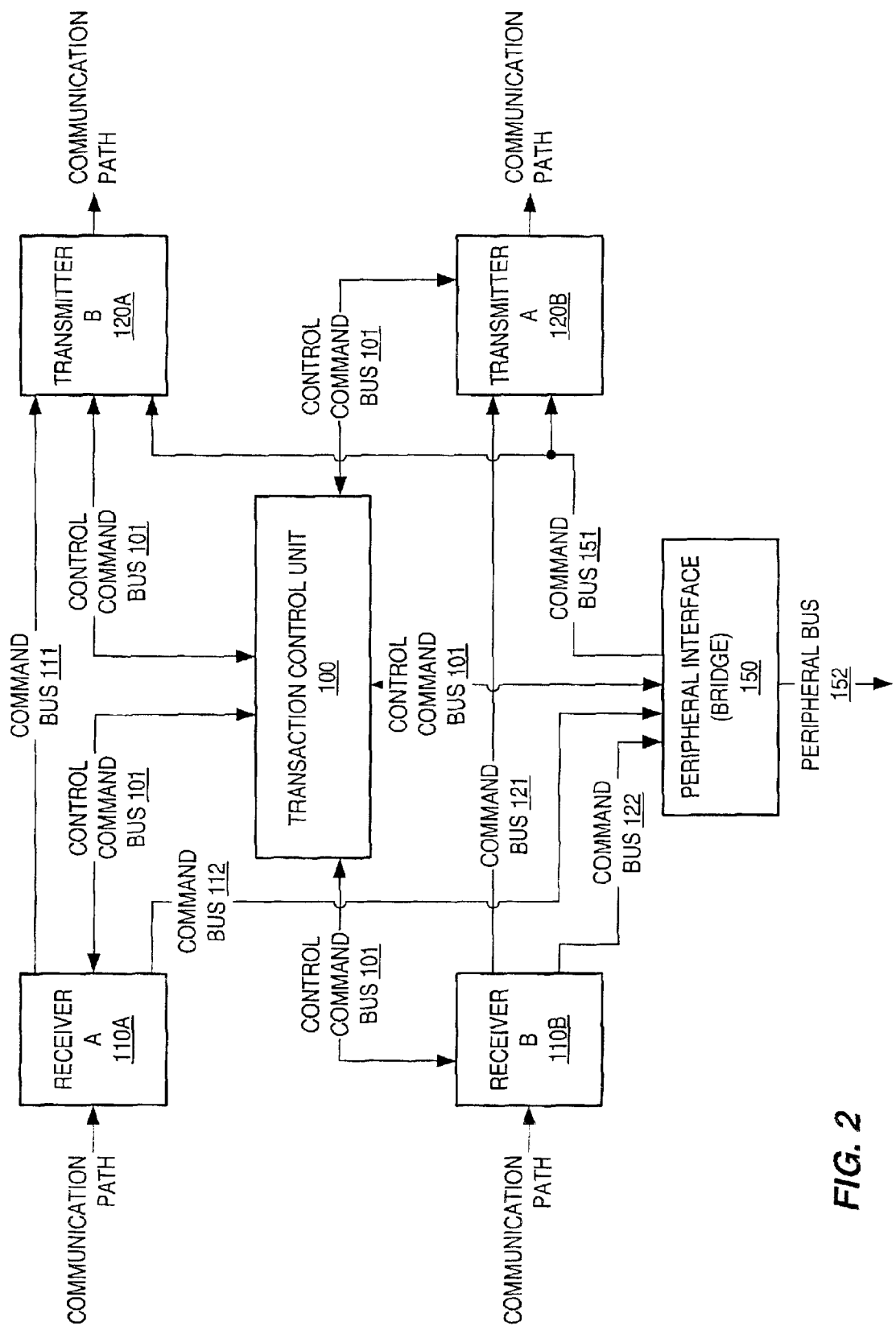
FIG. 2 is a block diagram of one embodiment of an I/O node including a tunnel device.

Referring to FIG. 2, a block diagram of one embodiment of an I/O node including a tunnel device is shown. The I/O node is representative of any of I/O nodes 20, 30 or 40 of FIG. 1 and will hereinafter be referred to as I/O node 20 for simplicity. I/O node 20 of FIG. 2 includes a receiver 110A which is coupled to a transmitter 120B via a command bus 11 and to peripheral interface 150 via a command bus 112. I/O node 20 also includes a receiver 110B which is coupled to a transmitter 120A via a command bus 121 and to peripheral interface 150 via a command bus 122. It is noted that receiver 110A and 110B may have similar functionality and may thus be referred to as receivers 110. Likewise, the same may be true for transmitter 120A and 120B. Peripheral interface 150 is also coupled to transmitters 120 via a command bus 151 and to peripheral bus 152. Additionally, I/O node 20 includes a transaction control unit 100 which is coupled to each receiver, each transmitter and to peripheral interface via a control command bus 101. As used herein, a command bus includes signals for command, control and data. Therefore, when a transaction or a command is referred as being sent over a respective command bus it includes command and data paths.

In the illustrated embodiment, receiver 110A and transmitter 120B form one communication path of the I/O tunnel and receiver 110B and transmitter 120A form a second communication path of the I/O tunnel. Each communication path may be an example of the NC packet bus links 50A–C of FIG. 1. Since each of the communication paths is unidirectional, either path may be connected as the upstream or downstream path. Thus, the injected traffic from peripheral interface 150 is provided to either of transmitters 120. It is noted that in one embodiment, NC packet bus links 50A–C may each be 16 bits wide. However, it is contemplated that in other embodiments, other widths may be used.

Receivers 110 may each receive packets into a receiver flow control buffer (not shown in FIG. 2). As each packet is received, a control command is generated which may contain a subset of the information contained in the received command portion of the packet. The control command may include several fields including the Unit ID of the originating node, destination information, a data count and the type command or virtual channel it belongs to, for example. It is noted that the control command may include other information or may not include some of the information described above. Receivers 110 may send each control command to transaction control unit 100.

Transaction control unit 100 may store each control command that it receives into one or more buffer structures (not shown) in the order that they were received. Based on the control commands that transaction control unit 100 stores in its buffers, transaction control unit 100 may decide the order that the corresponding commands waiting in source flow control buffers (e.g. receiver and/or peripheral interface buffers) may be sent. Transaction control unit 100 may arbitrate between transactions in its buffers and may be responsible for the overall flow of transactions through the tunnel of an I/O node.

Once transaction control unit 100 arbitrates which transaction will be processed, transaction control unit 100 may direct the respective receiver or peripheral interface to send a pending transaction to the target device. For example, the transaction control unit 100 selects a control command from its buffer that is representative of one or more packets being forwarded from receiver 110A to transmitter 120B. Transaction control unit 100 notifies receiver 110A to send the packet(s) to transmitter 120B via command bus 111. Transmitter 120B may then transmit the packet(s) to the next node in the chain. The next node may be another I/O node which is either upstream or downstream, or it may be a host node such as host processor 10A of FIG. 1. In addition, each time a receiver sends packets to a target device and thus frees up some of its buffer space, transaction control unit 100 may initiate a buffer release notification to another node that there is free space in the receive buffer.

As will be described further below in conjunction with the descriptions of FIG. 3 through FIG. 6, a receiver may include various circuits used to control the flow of transactions received from NC packet bus links 50. For example, upon receiving and storing command packets, a given receiver may receive an indication from transaction control unit 100 to send the packets to a target device. In one embodiment, the receiver may transmit the data in a packed double word format via the data path. For example, in one embodiment, the data path portion of command buses 111, 112, 121 and 122 may each be 128 bits wide. In such an embodiment, since a double word contains 32 bits, four double words of data may be conveyed at one time. Thus to fully utilize the bandwidth of the data bus, the receiver may transmit data four double words at a time when possible. In addition, depending on the type of virtual channel to which a transaction belongs, a receiver may include circuits for managing data buffers having a different number of locations than a corresponding command buffer. Further, a receiver may include circuits for handling broadcast command packets differently than other non-broadcast command packets.

Figure 3:
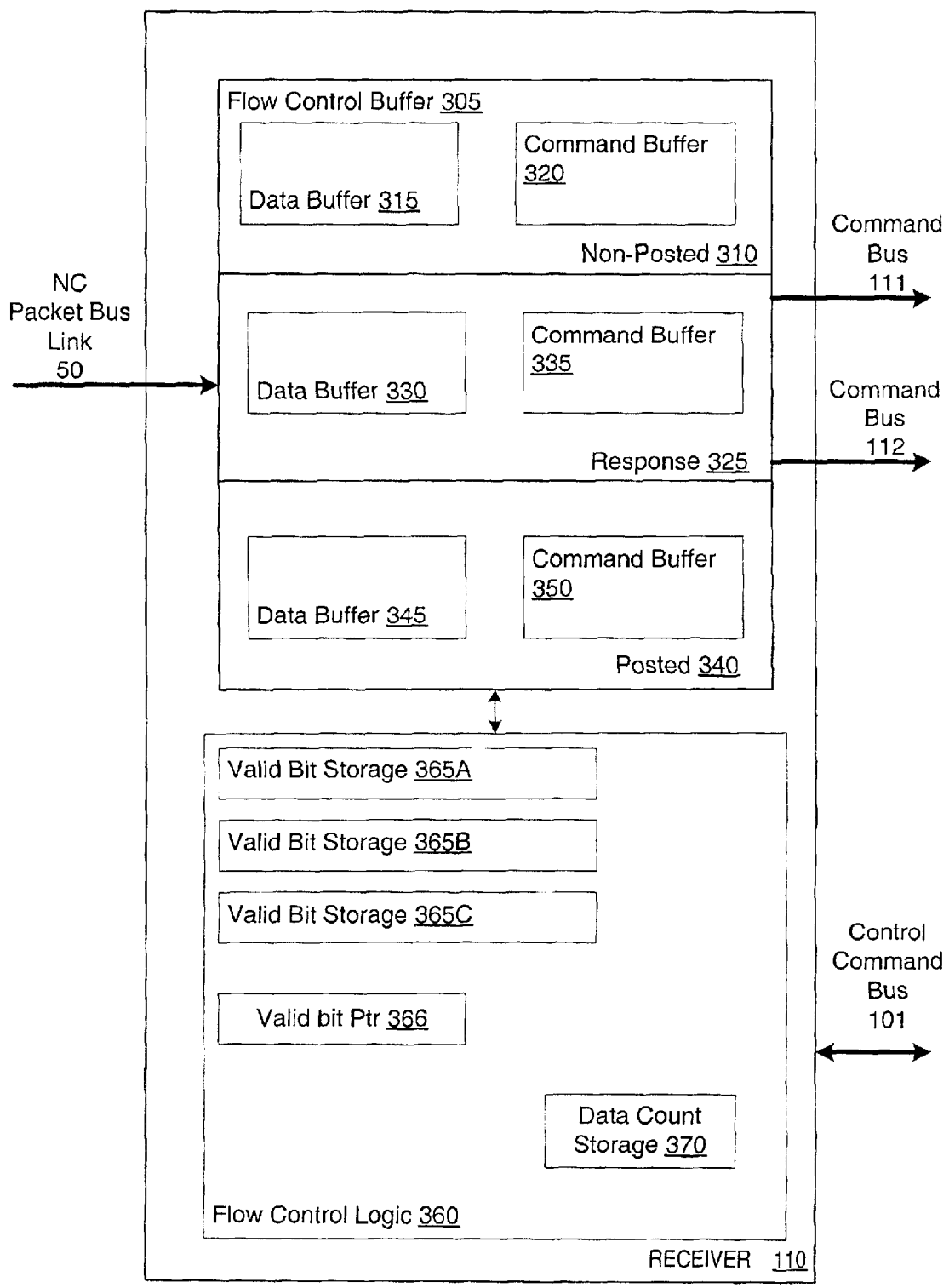
FIG. 3 is a block diagram of one embodiment of a receiver of an I/O node.

Turning to FIG. 3, a block diagram of one embodiment of receiver 110 of FIG. 2 is shown. Circuit components that correspond to those shown in FIG. 2 are numbered identically for simplicity and clarity. Receiver 110 includes a flow control buffer 305 coupled to a flow control logic unit 360. Receiver 110 is configured to receive packets via NC packet bus link 50 and to transmit command and data packets via command buses 111 and 112. Further, receiver 110 may transmit control commands via control command bus 101.

In the illustrated embodiment, flow control buffer 305 includes three independent buffer groups, each having its own buffers. The three buffer groups, non-posted 310, response 325 and posted 340 correspond to a different virtual channel. It is noted that other embodiments may include other numbers of buffer groups corresponding to other numbers of virtual channels. Each buffer group includes a data buffer and a command buffer. Specifically, non-posted 310 includes data buffer 315 and command buffer 320, response 325 includes data buffer 330 and command buffer 335 and posted 340 includes data buffer 345 and command buffer 350. Data buffers 315, 330 and 345 may each include one or more buffer locations configured to store data. In one embodiment, each buffer location is 64-bytes deep, which may correspond to a cache line of data. The number of locations may be dependent upon the type of peripheral interface circuit that is implemented within the I/O node and the target device to which the receiver is coupled. Further, each of command buffers 320, 335 and 350 may include one or more buffer locations configured to store command packets. It is noted that in one embodiment, data buffers 315, 330 and 345 and command buffers 320, 335 and 350 may be implemented in volatile memory storage units such as random access memory RAM, for example.

In the illustrated embodiment, flow control logic 360 includes valid bit storages 365A–C, a valid bit pointer 366 and a data count storage 370. As will be described further below, flow control logic 360 may use the combination of the counters and storages to keep track of which data to send, how many DWs to send in a given clock cycle and how to align the data on the data bus. Each of valid bit storages 365A–C is configured to store an indication of whether each location in data buffers 315, 330 and 345, respectively contain a valid double word of data. Valid bit storages 365A–C may each include a plurality of bit locations such that there may be one bit per double word for each 64-byte buffer within each of data buffers 315, 330 and 345. Each time a valid double word is stored within a given data buffer, a corresponding bit within the respective valid bit storage 365A–C is set. Thus, each bit location is an index into a respective data buffer. Although it is noted that in other embodiments, a bit may be cleared to indicate a valid double word of data.

Each of valid bit storages 365A–C may be a storage unit, such as a register including multiple bits, for example. It is noted that in other embodiments, other types of storage may be used such as a volatile memory storage unit such as RAM, for example.

Data count storage 370 is configured to hold a count value of the number of pending double words of data associated with the one command within the command buffers that has been selected to be transmitted on command bus 111 or 112 by transaction control unit 100. Data count storage 370 may be implemented as a counter/register unit, although other implementations are possible and contemplated.

Valid bit pointer 366 is a counter configured to store a value indicative of the bit location within valid bit storage 365 which is being checked during a current cycle. As described above the bit location within each of valid bit storages 365A–C is an index value into a respective data buffer. For example, if valid bit pointer 366 holds a value of two, it is pointing to bit location two within a given valid bit storage 365A–C, which in turn is an index into location two within a respective data buffer. The value at bit location two within valid bit storage 365A–C is indicative of whether the double word of data stored in the respective data buffer is valid. As will be described in greater detail below, during operation, valid bit pointer 366 may be initialized to a count of three if the data count storage 370 is greater than or equal to three. Otherwise it may be initialized to the value stored within data count storage 370. It is noted that other embodiments are contemplated that initialize valid bit pointer 366 to other values.

As described above, the data path portion of each of command buses 111 and 112 may be 128 bits wide. Thus, when data is sent via command buses 111 and 112, it may be sent four double words at a time, if the data is available. The data may also be aligned to the lowest order bits on the data path such that regardless of the number of double words sent, no invalid double words may intervene between the valid double words. For example, data bus bits 0–31 may convey double word zero and data bus bits 32–63 may convey double word one and so on. If double word one is valid, double word zero must also be valid. Thus, checking the valid bit of the highest numbered double word first may reduce latencies associated with packing the data for transmission. For example, when four double words are being sent, first checking if double word three is valid may save time because if double word three is valid, then double words two, one and zero are known to be valid. It is noted that other embodiments are contemplated that include a data path having other numbers of bits. In such embodiments, other numbers of double words may be sent in a given cycle to fully utilize the bus. Further, in other embodiments, it is contemplated that the data may be aligned to the highest order bits on the data path such that regardless of the number of double words sent, no invalid double words may intervene between the valid double words.

It is noted that although the embodiment shown in FIG. 3 depicts a specific implementation having particular counters and registers for keeping track of the number of double words to be sent, the data count, etc. It is contemplated that other embodiments may include other circuits having functionality which also keeps track of the number of double words to be sent, the data count, etc.

Figure 4:
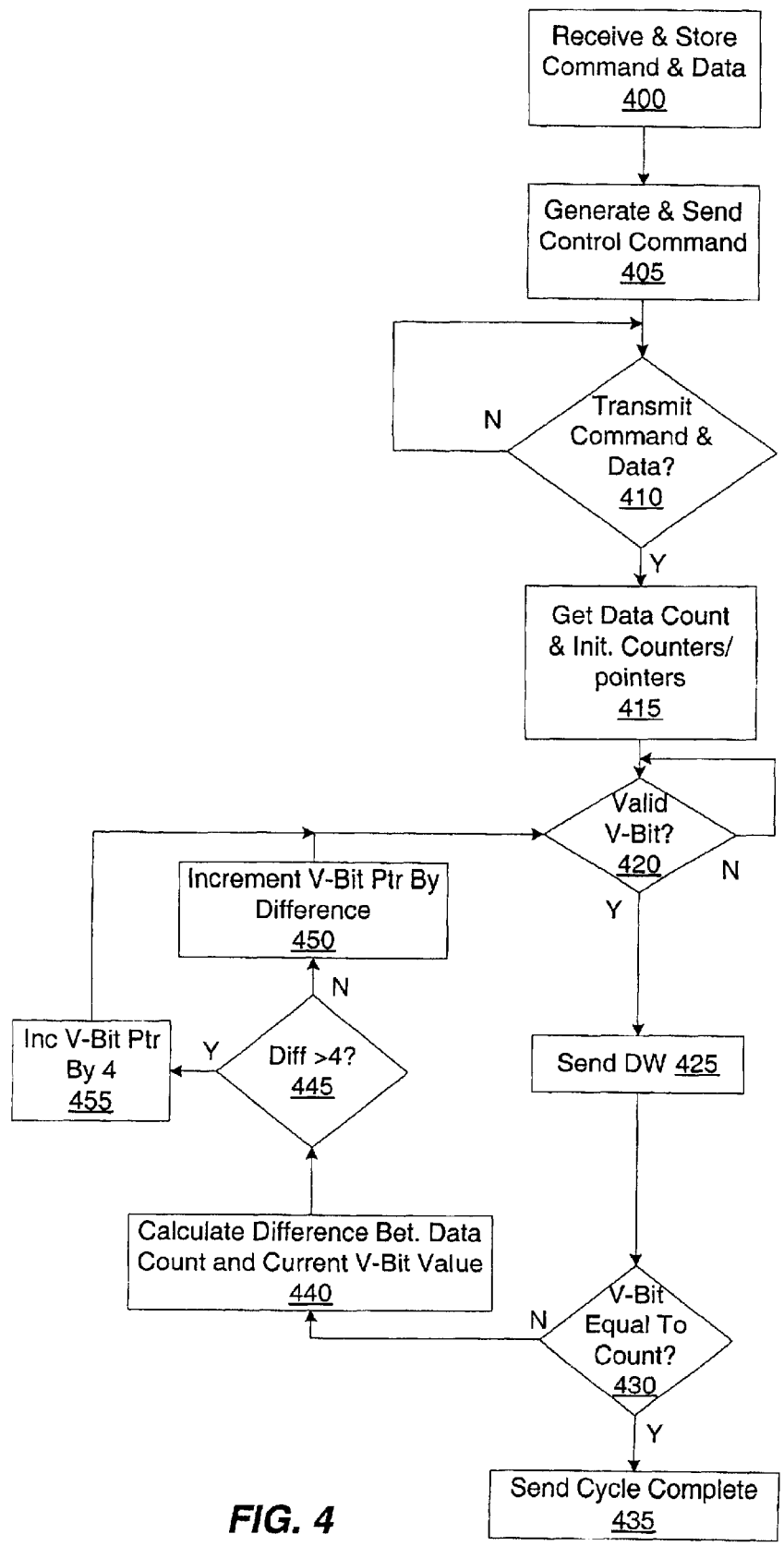
FIG. 4 is a flow diagram describing the operation of one embodiment of the receiver of FIG. 3.

Referring to FIG. 4, a flow diagram illustrating operation of one embodiment of receiver 110 of FIG. 3 is shown. To illustrate by example, during operation, receiver 110 receives a non-posted command and corresponding a data packet including six double words of data. Flow control logic 360 determines the command type. The command packet is stored within the non-posted 310 virtual channel command buffer 320 and the data packet is stored in the non-posted 310 data buffer 315 (block 400). The command packet includes the data count of the number of double words of data that are associated with the command. In this example, the data count value is five. As described above, flow control logic 360 also generates a control command corresponding to the command packet and transmits the control command to transaction control unit 100 lock 405).

Once the control command is sent to transaction control unit 100, receiver 110 may wait for an indication from transaction control unit 100 to transmit the command and data on command bus 111 or 112 (block 410). If transaction control unit 100 selects a winning command from receiver 110, flow control logic 360 may retrieve the data count from the command packet and initialize its counters and pointers (block 415). Since the data count contains a value of five double words, there are six DW of data to send, including DW zero. Thus, data count storage 370 is initialized to a count value of five. Valid bit pointer 366 is initialized to three.

Flow control logic 360 checks the valid bit stored in valid bit storage 365A pointed to by valid bit pointer 366 (block 420). If the valid bit is indicative of a valid double word of data, (in this embodiment, the bit would be set) then flow control logic 360 would cause the command packet stored in command buffer 320 and the first group or "beat" of data (e.g. up to four double words) stored within data buffer 315 to be sent on command bus 111 or 112, depending on the destination device (block 425). The value within valid bit pointer 366 is compared to the value stored in data count storage 370 (block 430). If the values are equal, then the cycle is complete and flow control logic 360 will transmit a cycle complete packet to the target device to indicate that all the data associated with the command packet has been sent (block 435). However, if the counts are not equal (block 430), the difference value between the value stored within data count storage 370 and the value within valid bit pointer 366 is calculated (block 440). If the value is not greater than four (block 445), valid bit pointer 366 is incremented by the difference value (block 450). However, if the difference value is greater than four (block 445), then valid bit pointer 366 is incremented by four (block 455). In this example, valid bit pointer 366 would be incremented by two and may now contain a value, of five.

Again, flow control logic 360 checks the valid bit stored in valid bit storage 365A pointed to by valid bit pointer 366 (block 420). Valid bit pointer 366 now has a value of five. If the valid bit is set indicative that a valid DW is stored at that location within data buffer 315, operation proceeds as described above in block 425.

It is noted that although a command packet may be selected by transaction control unit 100, all the data may not yet be stored in the corresponding data buffer. In such a case, for certain transaction types, the command packet may be sent and command bus 111 or 112 may be held off and the data sent when the data becomes available. The process described above may continue until the data is available.

Figure 5:
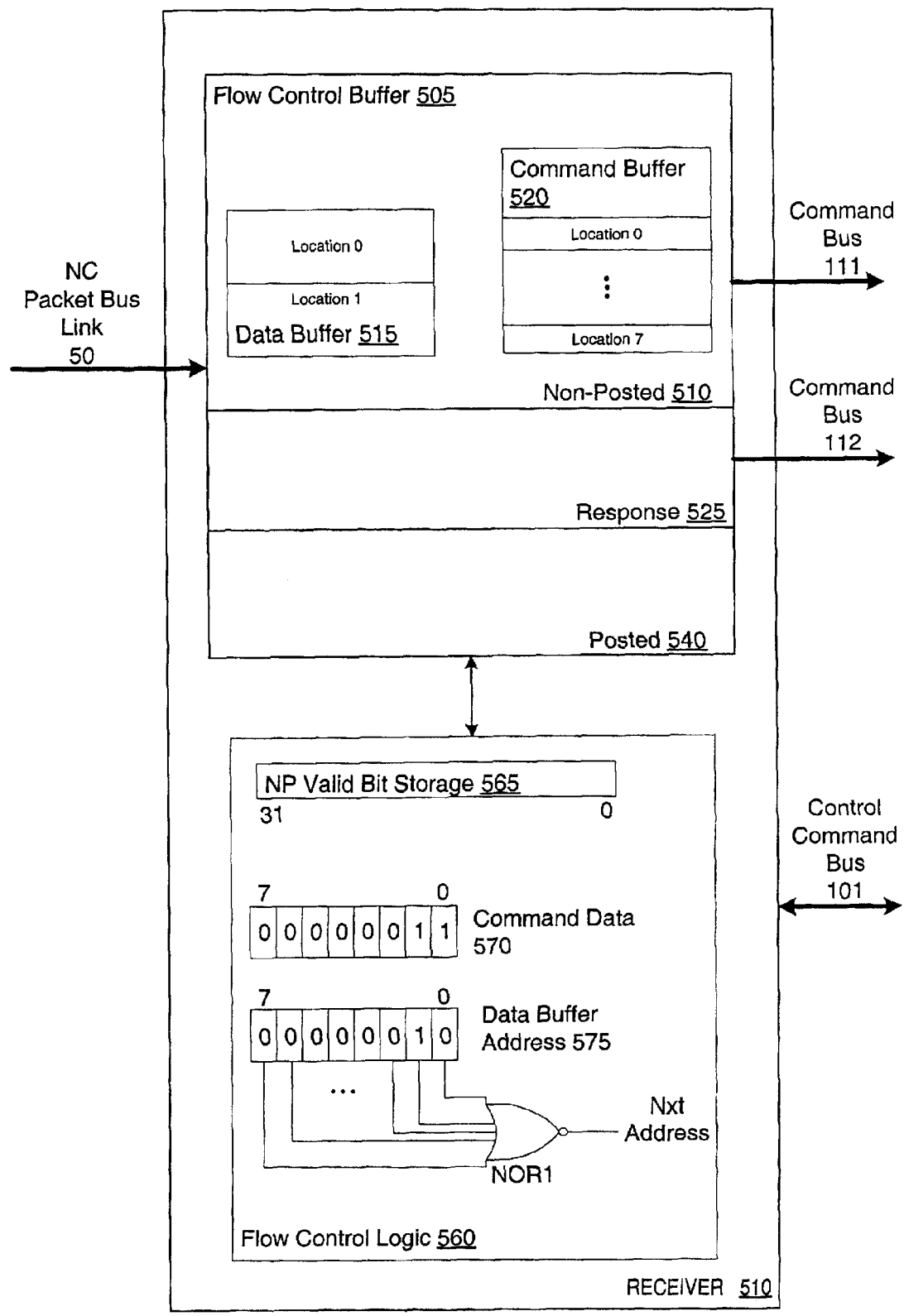
FIG. 5 is a block diagram of a second embodiment of a receiver of an I/O node.

Turning to FIG. 5, a block diagram of another embodiment of a receiver for an I/O node is shown. Circuit components that correspond to those shown in FIG. 2 are numbered identically for simplicity and clarity. Receiver 510 includes a flow control buffer 505 coupled to a flow control logic unit 560. Receiver 510 is configured to receive packets via NC packet bus link 50 and to transmit command and data packets via command buses 111 and 112. Further, receiver 510 may transmit control commands via control command bus 101.

In the illustrated embodiment, flow control buffer 505 includes three independent buffer groups, each having its own buffers. The three buffer groups, non-posted 510, response 525 and posted 540 correspond to a different virtual channel. It is noted that other embodiments may include other numbers of buffer groups corresponding to other numbers of virtual channels. Each buffer group includes a data buffer and a command buffer. Specifically, non-posted 510 includes data buffer 515 and command buffer 520. The following description includes packet handling within the non-posted channel, thus the data buffer and command buffer corresponding to response 525 and posted 540 are not shown for simplicity.

Since the non-posted channel may, in many cases, convey command packets that have no corresponding data, data buffer 515 has only two storage locations while command buffer 520 may include more storage locations. Data buffer 515; is shown having two buffer locations: locations 0 and 1, each configured to store data. In one embodiment, each buffer location is 64-bytes deep, which may correspond to a cache line of data. Further, command buffer 520 includes eight buffer locations configured to store command packets. It is noted that in one embodiment, data buffer 515 and command buffer 520 may be implemented in volatile memory storage units such as random access memory RAM, for example. It is further noted that other embodiments are contemplated having other numbers of command buffer locations.

In the illustrated embodiment, flow control logic 560 includes a non-posted (NP) valid bit storage 365, a command data storage 570, a data buffer address storage 575 and a NOR gate NOR1. Command data storage 570 includes eight storage locations which correspond to the eight locations within command buffer 520. Each bit within command data storage 570 is configured to store an indication of whether a given command stored within command buffer 520 has corresponding data. When a given command has corresponding data, the bit within command data storage 570 may be set, although, other embodiments are contemplated in which a cleared bit may indicate the presence of corresponding data. Further, since only two commands stored within command buffer 520 may have corresponding data, only two bits may be set within command data storage 570 at any given time.

Data buffer address storage 575 includes eight storage locations which correspond to the eight locations within command data storage 570. Each bit within data buffer address storage 575 is configured to store an indication of which of data buffer locations zero or one contains the corresponding data. For example, since only two commands stored within command buffer 520 may have corresponding data stored within data buffer 515 any given time, the data must be stored in either location zero or location one.

Therefore only one bit within data buffer address storage 575 may be set at any given time. If a bit is set within command data storage 570 and the bit within the same bit location is set within data buffer address storage 575, then the data corresponding to the bit location of within data buffer address storage 575 is stored in location one of data buffer 515. If a bit is set within command data storage 570 and the bit within the same bit location is clear within data buffer address storage 575, then the data corresponding to the bit location of within data buffer address storage 575 is stored in location zero of data buffer 515.

NP valid bit storage 565 is configured to store an indication of whether each of locations zero and one in data buffer 515 contains valid double words of data. Each time a valid double word is stored within a given data buffer, a bit within valid bit storage 565 is set. In the illustrated embodiment, NP valid bit storage 565 includes 32 bit locations which correspond to the 32 double words of data that may be stored within the two locations of data buffer 515. For example, in one embodiment, bit locations zero through 15 of NP valid bit storage 565 may correspond to location zero of data buffer 515 and bit locations 16 through 31 of NP valid bit storage 565 may correspond to location one of data buffer 515. It is noted that in other embodiments, a bit may be cleared to indicate a valid double word of data.

As described above, when a command stored within command buffer 520 is selected by transaction control unit 100, flow control logic 560 checks the valid bits associated with data stored in a given data buffer when deciding how to pack the data onto the data bus portion of command bus 11 or 112. In the illustrated embodiment, when a command stored within command buffer 520 is selected by transaction control unit 100, flow control logic 560 uses the combination of the command data storage 570, data buffer address 575 and NP valid bit storage 565 when deciding how to pack the data onto the data portion of command bus 111 or 112. For example, if a given NP command is selected, flow control logic 560 may first check command data storage 570 to see if there is corresponding data. If there is data, flow control logic 560 may then check data buffer address 575 to find out within which data buffer location the data is stored. Using this location information, flow control logic 560 will know which valid bits (e.g. 0–15 or 16–31) to look at when transmitting the double words across command bus 111 or 112. Flow control logic 560 may then transmit the data as described above in conjunction with the description of FIG. 3 and FIG. 4.

In the embodiment of FIG. 5, NOR-gate NOR1 is a multiple-input single-output NOR-gate. Each of the bit locations within data buffer address storage 570 is coupled to a separate input of NOR1. The output of NOR1 maybe used by flow control logic 560 as a pointer (Nxt Address) to the next address within data buffer 515 in which to store incoming data. As described above, only one bit within data buffer address storage 570 may be set at any give time and thus the bit-wise NOR of all the bits may be used to indicate the next address.

As described above in conjunction with the description of FIG. 2, when a receiver receives a command packet with a destination or target, upon selection by transaction control unit 100 the receiver may transmit the command packet and any corresponding data on command bus 111 or 112 depending upon the destination. Normal command packets may typically have a single destination or target. However, broadcast commands received in a tunnel device such as I/O nodes 20, 30 and 40 depicted in FIG. 1, may have two or more destinations. The destinations may be a transmitter such as transmitter 120A or 120B or peripheral interface 150, for example. Thus, in the embodiment described below in conjunction with FIG. 6, receiver 610 includes flow control logic 660 for handling broadcast commands.

Figure 6:
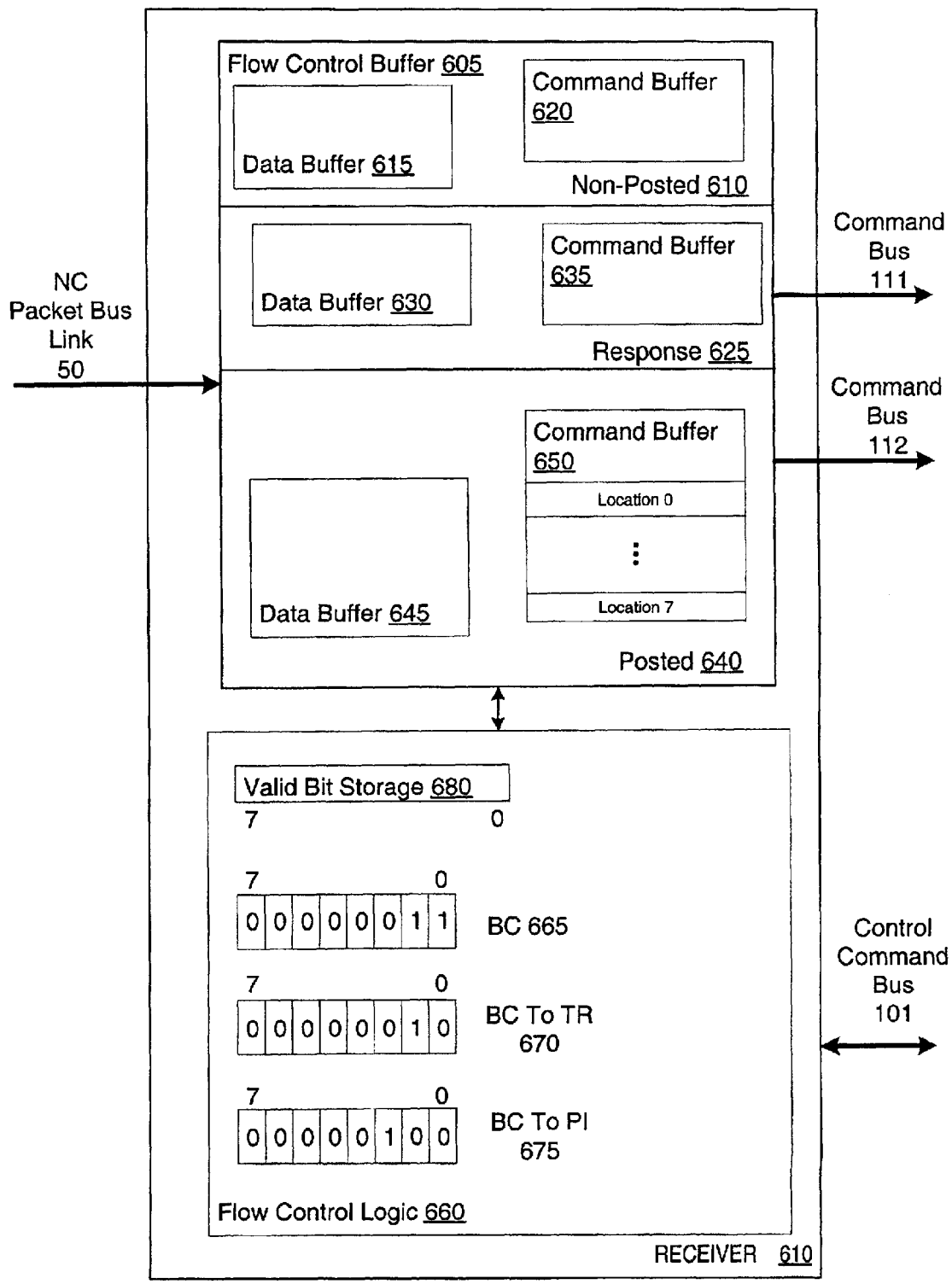
FIG. 6 is a block diagram of a third embodiment of a receiver of ant I/O node.

Referring to FIG. 6, a block diagram of another embodiment of a receiver for an I/O node is shown. Circuit components that correspond to those shown in FIG. 2 are numbered identically for simplicity and clarity. Receiver 610 includes a flow control buffer 605 coupled to a flow control logic unit 660. Receiver 610 is configured to receive packets via NC packet bus link 50 and to transmit command and data packets via command buses 111 and 112. Further, receiver 610 may transmit control commands via control command bus 101.

Similar to the descriptions of receiver 110 of FIG. 3 and receiver 510 of FIG. 5 above, flow control buffer 605 of receiver 610 also includes three independent buffer groups, each having its own buffers. The three buffer groups, non-posted 610, response 625 and posted 640 correspond to different virtual channels. It is noted that other embodiments may include other numbers of buffer groups corresponding to other numbers of virtual channels. Each buffer group includes a data buffer and a command buffer. Specifically, posted 640 includes data buffer 645 and command buffer 650. Since the following description includes broadcast packet handling within the posted channel, the data buffers and command buffers corresponding to response 625 and non-posted 610 are not described here for simplicity.

Data buffer 645 may include one or more buffer locations configured to store data. In one embodiment, each data buffer location may be 64-bytes deep, which may correspond to a cache line of data. The number of locations may be dependent upon the type of peripheral interface circuit that is implemented within the I/O node and the target device to which the receiver is coupled. Further, in the illustrated embodiment, command buffer 650 includes eight buffer locations configured to store command packets, although other embodiments are contemplated which have other numbers of buffer locations. It is noted that in one embodiment, data buffer 645 and command buffer 650 may be implemented in volatile memory storage units such as random access memory RAM, for example.

Flow control logic 660 includes storages designated broadcast command (BC) 665, BC to TR 670, BC to PI 675 and valid bit storage 680. Each storage may be a storage device such as a register, for example. Although other embodiments are contemplated that use other types of storages such as volatile memory, for example. BC storage 665 includes one or more bits each corresponding to one location within command buffer 650. For example, storage bit zero of BC 656 corresponds to command buffer 650 storage location zero. Each bit, when set, is indicative that the corresponding command stored within command buffer 650 is a broadcast command. It is contemplated that other embodiments may indicate a broadcast command using a clear bit. In addition, valid bit storage 680 is configured to store an indication of whether a valid command is stored within a corresponding location within command buffer 650. In one embodiment, a set bit within valid bit storage 680 indicates that a valid command is stored a corresponding location within command buffer 650. It is contemplated that other embodiments may indicate a valid command using a clear bit.

Similar to BC 665, BC to TR 670, BC to PI 675 and valid bit storage 680 each includes one or more bits each corresponding to one location within command buffer 650. BC to TR 670 is configured to store an indication of whether a broadcast command specified in the corresponding bit location has been transmitted to transmitter 120A or 120B, depending on the destination. BC to PI 675 is configured to store an indication of whether a broadcast command specified in the corresponding bit location has been transmitted to a peripheral interface such as peripheral interface 150, for example. In one embodiment, a set bit indicates that the broadcast command has been transmitted, although in other embodiments a clear bit may be indicative that broadcast command has been sent.

During operation, transaction control unit 100 may determine which commands to transmit on command bus 111 and 112 based partially on buffer availability in a destination indicated by each command. Thus, since there may be two destinations indicated by a broadcast command, transaction control unit 100 may wait to transmit the command until both destinations have buffer space available or are not blocked. However, this approach may lead to unnecessarily blocking the non-posted and response channels since the posted channel may logically block commands in the other virtual channels. Further, if transaction control unit 100 allows flow control logic 660 to independently send the broadcast command to each destination, care must taken to avoid releasing buffer space within command buffer 650 and data buffer 645 before the broadcast command is sent to both destinations, otherwise two buffer release commands may be inadvertently and erroneously sent.

Thus to overcome issues such as these, flow control logic 660 uses BC 665, BC to TR 670, BC to PI 675 and valid bit storage 680 to track whether a command is a broadcast command, whether the broadcast command has been sent to both destinations and whether a buffer release command may be sent. Upon transmitting a broadcast command to both destinations, both bits within BC to TR 670 and BC to PI 675 corresponding to the same broadcast command will be set. In response to this, flow control logic 670 may clear the appropriate valid bit within valid bit storage 680 and thus effectively releasing the buffer space. Flow control logic 660 may then issue a broadcast complete indication to transaction control unit 100 and transaction control unit 100 may then send a buffer release to other nodes to indicate the release of the buffer space.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A tunnel device for an input/output subsystem of a computer system comprising:
   a first interface configured to receive a plurality of data bytes associated with a command packet on a first external input/output bus;
   a second interface coupled to said first interface by an internal data path configured to convey up to a maximum number of said plurality of data bytes in a given cycle, wherein said second interface is configured to transmit said plurality of data bytes on a second external input/output bus; and
   a control unit coupled to control conveyance of said plurality of data bytes from said first interface to said second interface upon said internal data path;
   wherein said first interface is further configured such that when conveying a smaller number of said plurality of data bytes than said maximum number of said plurality of data bytes, said first interface aligns said smaller number of said plurality of data bytes on a corresponding number of designated bits of said internal data path with no intervening invalid data bytes.

2. The tunnel device as recited in claim 1, wherein said maximum number of said plurality of data bytes is 16.

3. The tunnel device as recited in claim 2, wherein said maximum number of said plurality of data bytes includes four subsets of data bytes.

4. The tunnel device as recited in claim 3, wherein said four subsets of data bytes include a first subset of data bytes having a first fixed number of data bytes.

5. The tunnel device as recited in claim 4, wherein said first fixed number of data bytes is four.

6. The tunnel device as recited in claim 4, wherein said four subsets of data bytes include a second subset of data bytes having a second fixed number of data bytes, wherein said second subset of data bytes includes said first subset of data bytes.

7. The tunnel device as recited in claim 6, wherein said second fixed number of data bytes is eight.

8. The tunnel device as recited in claim 6, wherein said four subsets of data bytes include a third subset of data bytes having a third fixed number of data bytes, wherein said third subset of data bytes includes said first subset of data bytes and said second subset of data bytes.

9. The tunnel device as recited in claim 8, wherein said third fixed number of data bytes is 12.

10. The tunnel device as recited in claim 8, wherein said four subsets of data bytes includes a fourth subset of data bytes having a fourth fixed number of data bytes, wherein said fourth subset of data bytes includes said first subset of data bytes, said second subset of data bytes and said third subset of data bytes.

11. The tunnel device as recited in claim 10, wherein said fourth fixed number of data bytes is 16.

12. The tunnel device as recited in claim 10, wherein said first interface is further configured to transmit said first, said second, said third and said fourth subset of data bytes on said corresponding number of designated bits of said internal data path such that said first subset of data bytes is aligned to a lowest order group of bits of said internal data path.

13. The tunnel device as recited in claim 10, wherein said first interface is further configured to transmit said first, said second, said third and said fourth subset of data bytes on said corresponding number of designated bits of said internal data path such that said first subset of data bytes is aligned to a highest order group of bits of said internal data path.

14. The tunnel device as recited in claim 1, wherein said first interface is further configured to transmit said smaller number of said plurality of data bytes in response to determining that at least said maximum number of said plurality of data bytes has not been received by said first interface.

15. The tunnel device as recited in claim 1, wherein said first interface is further configured to convey a control command corresponding to said command packet to said control unit via a second internal data path bus.

16. The tunnel device as recited in claim 15, wherein said control command contains a subset of information contained in said command packet.

17. The tunnel device as recited in claim 16, wherein said first interface is configured to convey said control command in response to receiving said command packet.

18. A method of conveying data in a tunnel device for an input/output subsystem of a computer system, said method comprising:

receiving a plurality of data bytes associated with a command packet on a first external input/output bus;

conveying up to a maximum number of said plurality of data bytes in a given cycle on an internal data path; and transmitting said plurality of data bytes on a second external input/output bus;

wherein when conveying a smaller number of said plurality of data bytes than said maximum number of said plurality of data bytes, aligning said smaller number of said plurality of data bytes on a corresponding number of designated bits of said internal data path with no intervening invalid data bytes.

19. The method as recited in claim 18, wherein said maximum number of said plurality of data bytes is 16.

20. The method as recited in claim 19, wherein said maximum number of said plurality of data bytes includes four subsets of data bytes.

21. The method as recited in claim 20, wherein said four subsets of data bytes include a first subset of data bytes having a first fixed number of data bytes.

22. The method as recited in claim 21, wherein said first fixed number of data bytes is four.

23. The method as recited in claim 21, wherein said four subsets of data bytes include a second subset of data bytes having a second fixed number of data bytes, wherein said second subset of data bytes includes said first subset of data bytes.

24. The method as recited in claim 23, wherein said second fixed number of data bytes is eight.

25. The method as recited in claim 23, wherein said four subsets of data bytes include a third subset of data bytes having a third fixed number of data bytes, wherein said third subset of data bytes includes said first subset of data bytes and said second subset of data bytes.

26. The method as recited in claim 25, wherein said third fixed number of data bytes is 12.

27. The method as recited in claim 25, wherein said four subsets of data bytes includes a fourth subset of data bytes having a fourth fixed number of data bytes, wherein said fourth subset of data bytes includes said first subset of data bytes, said second subset of data bytes and said third subset of data bytes.

28. The method as recited in claim 27, wherein said fourth fixed number of data bytes is 16.

29. The method as recited in claim 27 further comprising transmitting said first, said second, said third and said fourth subset of data bytes on said corresponding number of designated bits of said internal data path such that said first subset of data bytes is aligned to a lowest order group of bits of said internal data path.

30. The method as recited in claim 27 further comprising transmitting said first, said second, said third and said fourth subset of data bytes on said corresponding number of designated bits of said internal data path such that said first subset of data bytes is aligned to a highest order group of bits of said internal data path.

31. The method as recited in claim 18 further comprising transmitting said smaller number of said plurality of data bytes in response to determining that at least said maximum number of said plurality of data bytes has not been received.

32. The method as recited in claim 18, further comprising conveying a control command corresponding to said command packet to said control unit via a second internal data path bus.

33. The method as recited in claim 32, wherein said control command contains a subset of information contained in said command packet.

34. The method as recited in claim 33 further comprising conveying said control command in response to receiving said command packet.

35. A computer system comprising:

a processor;

one or more input/output nodes coupled to said processor and to each other via a plurality of external input/output buses in a chain, said one or more input/output nodes each having a tunnel device including:

a first interface configured to receive a plurality of data bytes associated with a command packet on a first one of said plurality of external input/output buses;

a second interface coupled to said first interface by an internal data path configured to convey up to a maximum number of said plurality of data bytes in a given cycle, wherein said second interface is configured to transmit said plurality of data bytes on a second one of said plurality of external input/output buses; and a control unit coupled to control conveyance of said plurality of data bytes from said first interface to said second interface upon said internal data path;

wherein said first interface is further configured such that when conveying a smaller number of said plurality of data bytes than said maximum number of said plurality of data bytes, said first interface aligns said smaller number of said plurality of data bytes on a corresponding number of designated bits of said internal data path with no intervening invalid data bytes.

* * * * *